Figure 1:
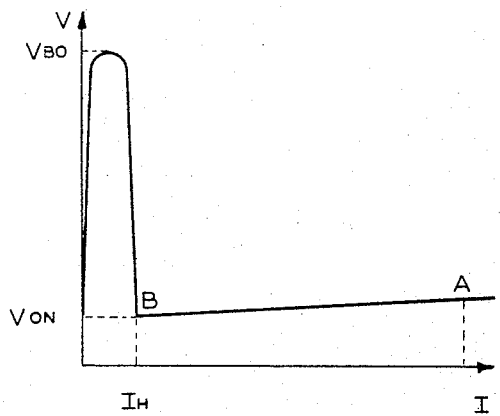

July 25, 1967   R. L. SELS ET AL   3,333,195
APPARATUS EMPLOYING A VOLTAGE DIFFERENCE CAPACITOR
NETWORK FOR MEASURING THE HOLD CURRENT
OF NEGATIVE RESISTANCE DEVICES
Filed April 7, 1965

INVENTORS
R.L. SELS
G.F. STETZLER
By *M. Pfeffer*
ATTORNEY

United States Patent Office 3,333,195
Patented July 25, 1967

3,333,195
APPARATUS EMPLOYING A VOLTAGE DIFFERENCE CAPACITOR NETWORK FOR MEASURING THE HOLD CURRENT OF NEGATIVE RESISTANCE DEVICES
Robert L. Sels, Reading, and Grant F. Stetzler, Temple, Pa., assignors to Western Electric Company, Incorporated, New York, N.Y., a corporation of New York
Filed Apr. 7, 1965, Ser. No. 446,168
6 Claims. (Cl. 324—158)

This invention relates generally to measuring circuits and, more particularly, to circuits for measuring the hold current of a negative resistance device. Accordingly, the general objects of this invention are to provide new and improved circuits of such a character.

Negative resistance devices, such as PNPN diodes, are characterized by a voltage vs. current characteristic which includes an unstable negative resistance portion bounded by a low conduction, positive resistance portion and a high conduction, positive resistance portion. An applied forward voltage in excess of a critical breakdown voltage $V_{BO}$, referred to as the breakover voltage, is required to move the operating point of the diode from its low conduction, positive resistance portion into its negative resistance portion. Since the diode is unstable in its negative resistance portion, however, its operating point is immediately transferred to the high conduction, positive resistance portion of its characteristic. If at any time thereafter, the current through the diode falls below a critical level $I_H$, referred to as the hold current, the diode returns to its low conduction, positive resistance condition. Generally, the low conduction state of the diode is referred to as the "OFF" state, and the high conduction state thereof is referred to as the "ON" state.

One way in which the hold current $I_H$ may be measured is by applying a voltage or current to the diode sufficient to turn it "ON." The current through the diode may then be slowly decreased, while continuously monitoring the same, until the diode turns "OFF." The current indication immediately prior to the diode turning "OFF" is, of course, the hold current. While this technique may be used effectively in the laboratory, it is especially cumbersome and time consuming to use in production testing of diodes.

Accordingly, it is another object of this invention to provide a new and improved circuit of a relatively simple nature for automatically measuring the hold current of a negative resistance device, such as a PNPN diode.

With the foregoing and other objects in view, a circuit illustrating certain features of the invention may include a first capacitor connected in parallel with a device to be tested, and a second capacitor connected in parallel with the device and a series resistor. A charging current is applied to the network thus formed to charge the capacitors and to turn "ON" the device. The charging current is then terminated and the capacitors allowed to discharge through the device, the capacitors discharging through the device until the device turns "OFF." The voltage across the first capacitor at this time is equal to the voltage across the device, and the voltage across the second capacitor is equal to the voltage across the device plus that across the series resistor. This latter voltage is proportional to the hold current of the device, and is measured by subtracting the voltage stored by the first capacitor from that stored by the second. Advantageously, the value of the series resistor is such that the voltage drop thereacross is decimally related to the current therethrough, so that the voltage measurement indicates directly the numerical value of the hold current.

Figure 2:
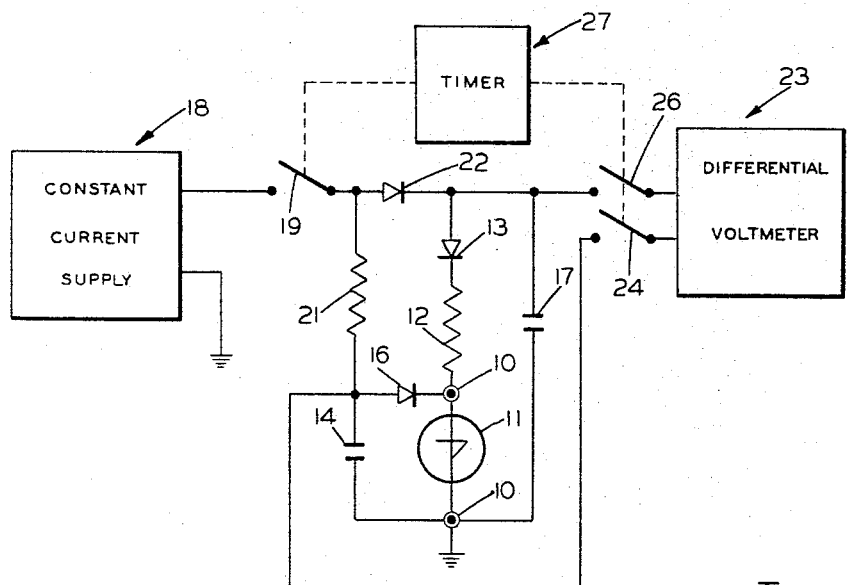

Other objects, advantages and features of the invention will be apparent from the following detailed description of a specific embodiment thereof, when read in conjunction with the appended drawings, in which:

FIG. 1 is an illustration of the voltage vs. current characteristic of a typical PNPN diode; and FIG. 2 is a circuit according to the invention for measuring the hold current of a negative resistance device, such as a PNPN diode.

Illustratively, the invention will be described as being employed to measure the hold current of a PNPN diode having the voltage vs. current characteristic depicted in FIG. 1. In FIG. 1, $V_{BO}$ is the breakover voltage of the diode; A is an operating point on the high conduction, positive resistance portion of the characteristic curve; B is the point below which the diode turns "OFF"; $I_H$ is the current of the diode at point B (i.e., the hold current); and $V_{ON}$ is the voltage across the diode at point B.

Referring now to FIG. 2, there is shown a pair of test terminals 10—10 for receiving a PNPN diode 11 to be tested. The test terminals 10—10 are connected in a series circuit which includes a series resistor 12 and a conventional diode 13. A first capacitor 14 is essentially connected in parallel with the test terminals 10—10. For purposes which will be set forth below, a conventional diode 16 is interposed between the capacitor 14 and one of the terminals 10—10. A second capacitor 17 is connected in parallel with the series circuit. A D.C. power supply 18, which may be of the constant current type, is connected through a contact 19 and a resistor 21 to the first capacitor 14 and is connected through the contact 19 and a conventional diode 22 to the second capacitor 17. A differential voltmeter 23 is connected to the capacitors 14 and 17 through respective contacts 24 and 26.

In operation, the contact 19 is closed to apply respective constant currents to the capacitors 14 and 17 to charge the same. The capacitors 14 and 17 are allowed to charge for a time such that the voltage developed across the first capacitor 14 is greater than $V_{ON}$ and that developed across the second capacitor 17 is greater than the breakover voltage $V_{BO}$. Accordingly, the diode 11 turns "ON," its operating point thereby being switched to point A. The contact 19 is then opened, disconnecting the supply 18 and allowing the capacitors 14 and 17 to discharge through the diode 11. The discharge path for the capacitor 14 is traced from the capacitor 14 through the diode 16 and the diode 11, and the discharge circuit for the capacitor 17 is traced from the capacitor 17 through the diode 13, the resistor 12 and the diode 11. As the capacitors 14 and 17 discharge, the current through the diode decreases, resulting in the operating point of the diode moving from point A to point B. A further decrease in the current through the diode 11 causes the diode to turn "OFF" and return to its low conduction condition. This disables the discharge paths for the capacitors 14 and 17, whereby the capacitors store the voltages appearing thereacross at the time of turnoff. The difference between these voltages, $\Delta V_C$, is measured by operating the contacts 24 and 26 to connect the differential voltmeter 23 to the capacitors 14 and 17. As will be seen below, the voltage $\Delta V_C$ is directly proportional to $I_H$.

At point B, the voltages across the capacitors 14 and 17 are $$V_{C14} = V_{D16} + V_{ON}$$

and $$V_{C17} = V_{D13} + V_{R12} + V_{ON}$$

where $V_{R12}$ is the voltage across the resistor 12; and $V_{D13}$ and $V_{D16}$ are, respectively, the voltage drops across the diodes 13 and 16. The voltage $V_{R12}$ across the resistor $R_{12}$ is $$V_{R12} = I_{R12} R_{12}$$

where $I_{R12}$ is the current through the resistor $R_{12}$ at point B. The current through the diode 11 at point B is $$I_H = I_{R12} + I_{C14}$$

where $I_{C14}$ is the current supplied to the diode 11 from the capacitor $C_{14}$. During transition of the operating point of the diode 11 from point A to point B, the capacitor $C_{14}$ discharges such that the current therefrom $I_{C14}$ is just sufficient to maintain a forward voltage drop across the diode 16. Accordingly, the current $I_{C14}$ is very small and can be neglected, whereby $$I_H = I_{R12}$$

The voltage $V_{C17}$, therefore, becomes $$V_{C17} = V_{D13} + I_H R_{12} + V_{ON}$$

The difference, $\Delta V_C$, between the voltage $V_{C14}$ and $V_{C17}$ is $$\Delta V_C = I_H R_{12} + V_{ON} + V_{D13} - V_{ON} - V_{D16}$$
$$\Delta V_C = I_H R_{12} + V_{D13} - V_{D16}$$

The diodes 13 and 16 are selected such that their forward voltage drops are approximately equal. Accordingly $$\Delta V_C = I_H R_{12}$$

Advantageously, the value of the resistor 12 is selected such that it is a power of ten (e.g., the resistor 12 may be 100 ohms), whereby $\Delta V_C$ is decimally related to $I_H$, and the differential voltmeter 23 indicates directly the numerical value of $I_H$.

It should be noted that the function of the diodes 16 and 22 is to preclude the capacitor 17 from discharging through the capacitor 14 after the diode 11 has been turned "OFF." The capacitor 14, of course, cannot discharge into the capacitor 17 since the voltage stored by the latter capacitor is at a higher value. The purpose of the diode 13, as seen above, is to compensate for the drop across the diode 16.

Advantageously, the contacts 19, 24 and 26 are operated in the required sequence, and at the required times, by a suitable timer 27.

As used herein, the term "negative resistance device" means any device having a low conduction state and a high conduction state, one value of voltage or current being necessary to switch the device from its low conduction state to its high conduction state, and a lower value of voltage or current being necessary to maintain the device in its high conduction state. Examples of such devices are silicon controlled rectifiers, unijunction transistors, tunnel diodes and gas diodes. The terms "hold current" and "ON" voltage signify, respectively, the minimum current and minimum voltage to maintain such a device in its high conduction state.

It is to be understood that the above-described embodiment is merely illustrative of the principles of the invention. Other embodiments may be devised by persons skilled in the art which embody these principles and fall within the spirit and scope thereof.

What is claimed is:

1. A circuit for measuring the hold current of a negative resistance device, which comprises:
    (a) a series circuit including a resistor and a pair of test terminals for receiving the device;
    (b) a first capacitor connected in parallel relationship with the test terminals;
    (c) a second capacitor connected in parallel with the series circuit;
    (d) means operable for a predetermined time
        to charge the first capacitor to a voltage greater than the "ON" voltage of the device,
        to charge the second capacitor to a voltage greater than that necessary to turn "ON" the device, so that the device turns "ON" during the predetermined time, and
        to allow the capacitors to discharge through the device after the expiration of the time interval until the device turns "OFF," the voltage drop across the resistor at the time the device turns "OFF" being proportional to the hold current thereof; and
    (e) means for subtracting the voltage stored by the first capacitor from that stored by the second to determine the voltage drop across the resistor at the time the device turns "OFF" and hence, to determine the hold current of the device.

2. A circuit in accordance with claim 1 wherein the subtracting means includes a differential voltmeter.

3. A circuit in accordance with claim 1 wherein the value of the resistor is such that the voltage drop thereacross is decimally related to the current therethrough.

4. A circuit in accordance with claim 1 wherein:
    a first diode is interposed between the first capacitor and the device under test to preclude the second capacitor from discharging into the first; and
    a second diode is interposed in the series circuit to compensate for the voltage drop across the first diode.

5. A circuit in accordance with claim 1 wherein element (d) includes:
    a power supply;
    a normally open contact; and
    a timer for first closing the contact to enable charging of the capacitors and for then opening the contact after a predetermined time to allow discharging of the capacitors.

6. A circuit in accordance with claim 5 wherein additional contacts operated by the timer are provided for connecting the subtracting means to the capacitors after the device has been turned "OFF."

References Cited
UNITED STATES PATENTS

| | | | |
|---|---|---|---|
| 2,591,511 | 4/1952 | Clarke | 324—111 X |
| 2,924,769 | 2/1960 | Harriman | 324—111 X |
| 3,048,779 | 8/1962 | Davis | 324—158 |

RUDOLPH V. ROLINEC, *Primary Examiner.*

E. L. STOLARUN, *Assistant Examiner.*